(12) United States Patent
Macciola et al.

(10) Patent No.: US 10,140,511 B2
(45) Date of Patent: Nov. 27, 2018

(54) BUILDING CLASSIFICATION AND EXTRACTION MODELS BASED ON ELECTRONIC FORMS

(71) Applicant: Kofax, Inc., Irvine, CA (US)

(72) Inventors: Anthony Macciola, Irvine, CA (US); Jan W. Amtrup, Silver Spring, MD (US); Stephen Michael Thompson, Oceanside, CA (US)

(73) Assignee: KOFAX, INC., Irvine, CA (US)

( * ) Notice: Subject to any disclaimer, the term of this patent is extended or adjusted under 35 U.S.C. 154(b) by 121 days.

(21) Appl. No.: 15/396,322

(22) Filed: Dec. 30, 2016

(65) Prior Publication Data
US 2017/0109610 A1 Apr. 20, 2017

Related U.S. Application Data (63) Continuation-in-part of application No. 15/157,325, filed on May 17, 2016, now Pat. No. 9,996,741,
(Continued)

(51) Int. Cl.
| | | |
|---|---|---|
| *G06K 9/00* | (2006.01) | |
| *G06F 17/30* | (2006.01) | |
| *G06K 9/20* | (2006.01) | |

(52) U.S. Cl.
CPC .... *G06K 9/00469* (2013.01); *G06F 17/30011* (2013.01); *G06K 9/00449* (2013.01);
(Continued)

(58) Field of Classification Search
CPC .......... G06F 17/30011; G06K 9/00449; G06K 9/00456; G06K 9/00442
See application file for complete search history.

(56) References Cited

U.S. PATENT DOCUMENTS 8,503,769 B2 * 8/2013 Baker ................ G06K 9/00456
382/159
8,724,907 B1 * 5/2014 Sampson ............. G06K 9/6255
382/209
(Continued)

FOREIGN PATENT DOCUMENTS

| CN | 101295305 A | 10/2008 |
|---|---|---|
| CN | 101329731 A | 12/2008 |

(Continued)

OTHER PUBLICATIONS

Office Action from Japanese Patent Application No. 2016-502178, dated Apr. 10, 2018.
(Continued)

*Primary Examiner* — Utpal Shah
(74) *Attorney, Agent, or Firm* — Zilka-Kotab. P.C.

(57) ABSTRACT

According to one embodiment, a computer-implemented method is configured for building a classification and/or data extraction knowledge base using an electronic form. The method includes: receiving an electronic form having associated therewith a plurality of metadata labels, each metadata label corresponding to at least one element of interest represented within the electronic form; parsing the plurality of metadata labels to determine characteristic features of the element(s) of interest; building a representation of the electronic form based on the plurality of metadata labels; generating a plurality of permutations of the representation of the electronic form by applying a predetermined set of variations to the representation; and training either a classification model, an extraction model, or both using: the representation of the electronic form, and the plurality of permutations of the representation of the electronic form. Corresponding systems and computer program products are also disclosed.

20 Claims, 3 Drawing Sheets

Related U.S. Application Data which is a continuation of application No. 13/802,226, filed on Mar. 13, 2013, now Pat. No. 9,355,312, which is a continuation-in-part of application No. 14/818,196, filed on Aug. 4, 2015, now Pat. No. 9,754,164, which is a continuation of application No. 14/209,825, filed on Mar. 13, 2014, now Pat. No. 9,311,531.

(60) Provisional application No. 61/780,747, filed on Mar. 13, 2013.

(52) U.S. Cl.
CPC ....... *G06K 9/00456* (2013.01); *G06K 9/2072* (2013.01); *G06K 2209/01* (2013.01); *G06K 2209/27* (2013.01)

(56) References Cited

U.S. PATENT DOCUMENTS

| | | | |
|---|---|---|---|
| 9,058,327 B1* | 6/2015 | Lehrman | G06F 17/30707 |
| 9,298,979 B2 | 3/2016 | Nepomniachtchi et al. | |
| 9,946,954 B2 | 4/2018 | Macciola et al. | |
| 2005/0163343 A1 | 7/2005 | Kakinami et al. | |
| 2005/0216564 A1 | 9/2005 | Myers et al. | |
| 2006/0033615 A1 | 2/2006 | Nou | |
| 2007/0003165 A1 | 1/2007 | Sibiryakov et al. | |
| 2007/0036432 A1 | 2/2007 | Xu et al. | |
| 2008/0225127 A1 | 9/2008 | Ming | |
| 2008/0232715 A1 | 9/2008 | Miyakawa et al. | |
| 2010/0045701 A1 | 2/2010 | Scott et al. | |
| 2011/0129153 A1 | 6/2011 | Petrou et al. | |
| 2011/0137898 A1* | 6/2011 | Gordo | G06F 17/30011 707/737 |
| 2012/0008858 A1 | 1/2012 | Sedky et al. | |
| 2012/0294524 A1 | 11/2012 | Zyuzin et al. | |
| 2013/0198192 A1* | 8/2013 | Hu | G06F 17/30705 707/738 |
| 2014/0047367 A1 | 2/2014 | Nielsen | |
| 2015/0086080 A1 | 3/2015 | Stein et al. | |
| 2015/0254469 A1* | 9/2015 | Butler | G06F 21/6218 706/12 |
| 2015/0317529 A1 | 11/2015 | Zhou et al. | |
| 2016/0063358 A1* | 3/2016 | Mehrseresht | G06F 17/30256 382/190 |
| 2016/0147891 A1* | 5/2016 | Chhichhia | G06F 17/30011 707/734 |
| 2016/0320466 A1 | 11/2016 | Berker et al. | |

FOREIGN PATENT DOCUMENTS

| | | |
|---|---|---|
| CN | 101493830 A | 7/2009 |
| JP | H09091341 A | 4/1997 |
| JP | 2000298702 A | 10/2000 |
| JP | 2004005624 A | 1/2004 |
| JP | 2004523022 A | 7/2004 |
| JP | 2006185367 A | 7/2006 |
| JP | 2009015396 A | 1/2009 |
| JP | 2009211431 A | 9/2009 |
| JP | 2011118513 A | 6/2011 |
| JP | 2011118600 A | 6/2011 |
| JP | 2012194736 A | 10/2012 |
| WO | 97006522 A1 | 2/1997 |

OTHER PUBLICATIONS

Office Action from Japanese Patent Application No. 2016-568791, dated Mar. 28, 2018.
Kawakatsu et al., "Development and Evaluation of Task Driven Device Orchestration System for User Work Support," Forum on Information Technology 10th Conference Proceedings, Institute of Electronics, Information and Communication Engineers (IEICE), Aug. 22, 2011, pp. 309-310.
Statement of Relevance of Non-Translated Foreign Document NPL: Kawakatsu et al., "Development and Evaluation of Task Driven Device Orcestration System for User Work Support," Forum on Information Technology 10th Conference Proceedings, Institute of Electronics, Information and Communication Engineers (IEICE), Aug. 22, 2011, pp. 309-310.
Non-Final Office Action from U.S. Appl. No. 15/214,351, dated May 22, 2018.
Examination Report from European Application No. 14773721.7, dated Mar. 27, 2018.
Office Action from Taiwanese Application No. 103114611, dated Feb. 8, 2018.
Office Action from Chinese Patent Application No. 201580014141.1, dated Feb. 6, 2018.
Non-Final Office Action from U.S. Appl. No. 15/385,707, dated Apr. 4, 2018.
Final Office Action from U.S. Appl. No. 15/234,993, dated Apr. 9, 2018.
Wang et al., "Object Recognition Using Multi-View Imaging," ICSP2008 Proceedings, IEEE, 2008, pp. 810-813.
Office Action from Chinese Patent Application No. 201480013621.1, dated Apr. 28, 2018.
Examination Report from European Application No. 14847922.3 dated Jun. 22, 2018.
Lenz et al., "Techniques for Calibration of the Scale Factor and Image Center for High Accuracy 3-D Machine Vision Metrology," IEEE Transactions on Pattern Anaysis and Machine Intelligence, vol. 10, No. 5, Sep. 1988, pp. 713-720.
Wang et al., "Single view metrology from scene constraints," Image and Vision Computing, vol. 23, 2005, pp. 831-840.
Criminisi et al., "A plane measuring device," Image and Vision Computing, vol. 17, 1999, pp. 625-634.
Notice of Allowance from U.S. Appl. No. 15/234,993, dated Jul. 5, 2018.
Final Office Action from U.S. Appl. No. 14/829,474, dated Jul. 10, 2018.
Notice of Allowance from U.S. Appl. No. 15/390,321, dated Aug. 6, 2018.
Corrected Notice of Allowance from U.S. Appl. No. 15/234,993, dated Aug. 1, 2018.
Notice of Allowance from U.S. Appl. No. 15/385,707, dated Aug. 15, 2018.
Corrected Notice of Allowance from U.S. Appl. No. 15/390,321, dated Sep. 19, 2018.

\* cited by examiner

BUILDING CLASSIFICATION AND EXTRACTION MODELS BASED ON ELECTRONIC FORMS

RELATED APPLICATIONS

This application is related to U.S. Pat. No. 9,355,312, filed Mar. 13, 2013; and U.S. Pat. No. 9,311,531, filed Mar. 13, 2014; each of which is herein incorporated by reference in its entirety.

FIELD OF INVENTION

The present invention relates to image capture and image processing. In particular, the present invention relates to using an electronic form as a knowledge base for building classification and extraction models configured to classify similar forms, and extract information therefrom.

BACKGROUND OF THE INVENTION

Digital images having depicted therein an object inclusive of documents such as a letter, a check, a bill, an invoice, etc. have conventionally been captured and processed using a scanner or multifunction peripheral (MFP) coupled to a computer workstation such as a laptop or desktop computer. Methods and systems capable of performing such capture and processing are well known in the art and well adapted to the tasks for which they are employed.

More recently, the conventional scanner-based and MFP-based image capture and processing applications have shifted toward mobile platforms, e.g. as described in the related patent applications noted above with respect to capturing and processing images using mobile devices (U.S. Pat. No. 8,855,375), classifying objects depicted in images captured using mobile devices (U.S. Pat. No. 9,355,312, e.g. at column 9, line 9-column 15, line 28), extracting data from images captured using mobile devices (U.S. Pat. No. 9,311, 531, e.g. at column 18, line 25-column 27, line 16), and even generating an electronic form based on knowledge obtained from analyzing an image of a document in light of a learn-by-example knowledge base (U.S. Pat. No. 9,275,281, e.g. at column 25, lines 56-61).

While these capture, processing, classification and extraction engines and methods are capable of reliably extracting information from certain objects or images, and generating electronic forms therefrom, these techniques rely on a plethora of training examples from which to generate sufficient a priori knowledge regarding different object types, types of information represented therein, and location of such information relative to the object.

The learn-by-example training process, and more importantly the exemplars of the training set, are necessary to enable robust object classification and data extraction despite the inherent variations in appearance of even the same exact object across different images. Skilled artisans will appreciate that factors such as capture angle, motion of the capture device during image capture, capture resolution, illumination conditions, capture distance, etc. all contribute to variations in the appearance of an object. In order to accommodate these variations, a learn-by-example training set representing all such variations within tolerable limits is generally employed, and subsequent test images are classified and data extracted therefrom (including determination of fields) using the trained classification/extraction model.

In practice, the above training-based automated approach frequently fails to identify all desired information, e.g. due to variations in the image extending beyond tolerable limits, such as a corner of the image being cast under a shadow and frustrating the identification of fields in the shadowed region, or distortions too severe to detect and bound a particular field for data extraction or optical character recognition. Similarly, even when fields are properly located, the type of data expected or suitable for entry in such fields may be difficult or impossible to discern, e.g. where text is missing or depicted according to an unexpected format.

To address these shortcomings, conventional solutions typically employ a human curator to review and correct the field determination and data type identification processes. For example, a classification and/or extraction result obtained by processing a particular image using learn-by-example classification and/or extraction models may be output and passed to a human user for validation of the identified field locations, field types, data types, etc. The human may provide input indicating a location of a field, field label, and data type associated with the field. These input information may be associated with the image as metadata, and the electronic form generation process may proceed with the added information provided by the human user.

However, this solution is both imperfect (inherently, as will all human-driven processes) and costly—both in terms of overall processing time, and economic cost of employing human curators to review a potentially vast volume of processing results.

And while it is possible to derive the necessary information, e.g. field location, field label, data type, etc. from a standardized form such as an electronic form with great accuracy and recall, such information would not be useful in the context of deriving similar information from other images of the same type of object (e.g. a physical representation of the electronic form) because such information is rigidly applicable to only the standardized representation of the form—variations arising from capture angle, illumination, etc. are not accounted for in the standardized representation and severely limit the scope to which the standardized representation is applicable for subsequent analysis of images.

Therefore, it would be highly beneficial to provide new techniques, systems and/or computer program product technology configured to process an electronic form and utilize information derived from such electronic form to build classification and/or extraction models suitable for classifying other similar forms, and extracting information therefrom in an efficient and reliable manner that is robust to variations between images of the same type of form.

SUMMARY

According to one embodiment, a computer-implemented method is configured for building a classification and/or data extraction knowledge base using an electronic form. The method includes: receiving an electronic form having associated therewith a plurality of metadata labels, each metadata label corresponding to at least one element of interest represented within the electronic form; parsing the plurality of metadata labels to determine characteristic features of the element(s) of interest; building a representation of the electronic form based on the plurality of metadata labels; generating a plurality of permutations of the representation of the electronic form by applying a predetermined set of variations to the representation; and training either a classification model, an extraction model, or both using: the representation of the electronic form, and the plurality of permutations of the representation of the electronic form.

In accordance with another embodiment, a system includes a processor configured to execute logic. The logic is configured, upon execution thereof by the processor, to cause the processor to perform a computer-implemented method including: receiving an electronic form having associated therewith a plurality of metadata labels, each metadata label corresponding to at least one element of interest represented within the electronic form; parsing the plurality of metadata labels to determine characteristic features of the element(s) of interest; building a representation of the electronic form based on the plurality of metadata labels; generating a plurality of permutations of the representation of the electronic form by applying a predetermined set of variations to the representation; and training either a classification model, an extraction model, or both using: the representation of the electronic form, and the plurality of permutations of the representation of the electronic form.

According to yet another embodiment, a computer program product includes a computer readable storage medium having embodied thereon computer readable program instructions. The computer readable program instructions are configured to cause a mobile device, upon execution of the computer readable program instructions, to perform operations including: receiving an electronic form having associated therewith a plurality of metadata labels, each metadata label corresponding to at least one element of interest represented within the electronic form; parsing the plurality of metadata labels to determine characteristic features of the element(s) of interest; building a representation of the electronic form based on the plurality of metadata labels; generating a plurality of permutations of the representation of the electronic form by applying a predetermined set of variations to the representation; and training either a classification model, an extraction model, or both using: the representation of the electronic form, and the plurality of permutations of the representation of the electronic form.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing, and using an electronic form as a knowledge base for building classification and extraction models configured to classify similar forms, and extract information therefrom. Using electronic forms as a knowledge base drastically reduces the amount of training and improves the recall and accuracy of classification and extraction in a manner that reduces the overall computational cost of classification and extraction without sacrificing quality of results, therefore representing an improvement to the field of image processing and image processing devices. For instance, the overall cost of training due to the relatively low number of examples needed to train a model robustly, due to the high precision and quality of feature definitions provided with the electronic form.

According to one general embodiment, a computer-implemented method is configured for building a classification and/or data extraction knowledge base using an electronic form. The method includes: receiving an electronic form having associated therewith a plurality of metadata labels, each metadata label corresponding to at least one element of interest represented within the electronic form; parsing the plurality of metadata labels to determine characteristic features of the element(s) of interest; building a representation of the electronic form based on the plurality of metadata labels; generating a plurality of permutations of the representation of the electronic form by applying a predetermined set of variations to the representation; and training either a classification model, an extraction model, or both using: the representation of the electronic form, and the plurality of permutations of the representation of the electronic form.

In accordance with another general embodiment, a system includes a processor configured to execute logic. The logic is configured, upon execution thereof by the processor, to cause the processor to perform a computer-implemented method including: receiving an electronic form having associated therewith a plurality of metadata labels, each metadata label corresponding to at least one element of interest represented within the electronic form; parsing the plurality of metadata labels to determine characteristic features of the element(s) of interest; building a representation of the electronic form based on the plurality of metadata labels; generating a plurality of permutations of the representation of the electronic form by applying a predetermined set of variations to the representation; and training either a classification model, an extraction model, or both using: the representation of the electronic form, and the plurality of permutations of the representation of the electronic form.

According to yet another general embodiment, a computer program product includes a computer readable storage medium having embodied thereon computer readable program instructions. The computer readable program instructions are configured to cause a mobile device, upon execution of the computer readable program instructions, to perform operations including: receiving an electronic form having associated therewith a plurality of metadata labels, each metadata label corresponding to at least one element of interest represented within the electronic form; parsing the plurality of metadata labels to determine characteristic features of the element(s) of interest; building a representation of the electronic form based on the plurality of metadata labels; generating a plurality of permutations of the representation of the electronic form by applying a predetermined set of variations to the representation; and training either a classification model, an extraction model, or both using: the representation of the electronic form, and the plurality of permutations of the representation of the electronic form.

General Mobile Networking and Computing Concepts

As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
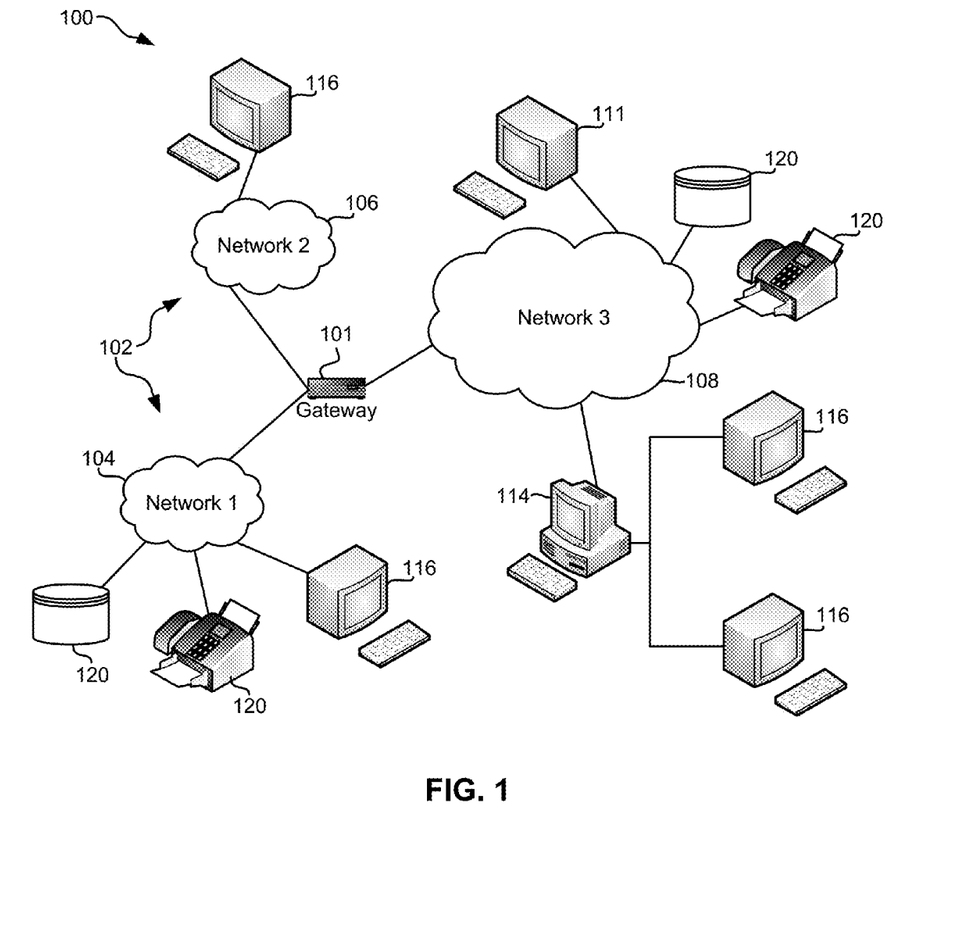
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
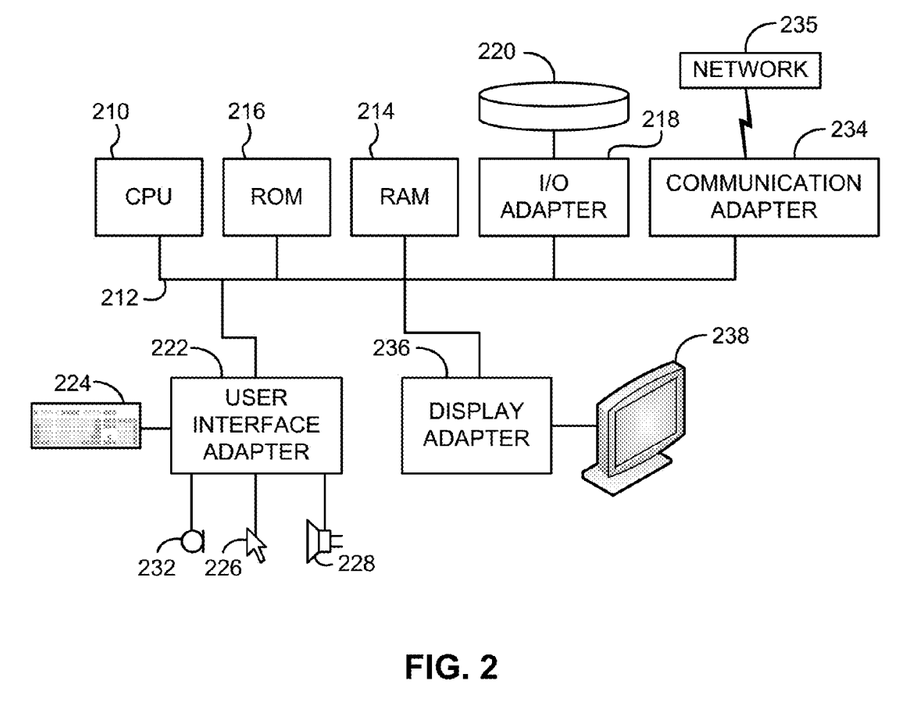
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may utilize and/or include any of the functionalities disclosed in related U.S. Patents, Patent Publications, and/or Patent Applications incorporated herein by reference. For example, digital images suitable for processing according to the presently disclosed algorithms may be subjected to image processing operations, such as page detection, rectangularization, detection of uneven illumination, illumination normalization, resolution estimation, blur detection, classification, data extraction, etc.

In more approaches, the presently disclosed methods, systems, and/or computer program products may be utilized with, implemented in, and/or include one or more user interfaces configured to facilitate performing any functionality disclosed herein and/or in the aforementioned related patent applications, publications, and/or patents, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related patent applications, publications, and/or patents, among others that would be appreciated by one having ordinary skill in the art upon reading these descriptions.

It will further be appreciated that embodiments presented herein may be provided in the form of a service deployed on behalf of a customer to offer service on demand.

Using Electronic Forms as Knowledge Bases

In general, the presently disclosed inventive concepts encompass the notion of using an electronic form, and the associated metadata defining the location and type of various information represented on/within the form, as input for a knowledge base configured to classify and extract information from other similar forms or documents.

Accordingly, the presently disclosed inventive concepts may leverage or include classification and/or extraction functionalities described in U.S. Pat. No. 9,355,312, and/or U.S. Pat. No. 9,311,531, respectively. However, a critical difference is that the learn-by-example training base is not utilized in the presently disclosed inventive concepts. Instead, an electronic form (i.e. a single document) serves as the input set from which knowledge are derived for subsequent classification and extraction of information from other documents/images.

As noted above, a single exemplar such as an electronic form is insufficient to encompass the plethora of potential variations that a single object may represent within digital images, videos, etc. representing the single object. However, standardized exemplars such as electronic forms convey the advantage of definite knowledge regarding the location of fields, field type, data type, etc. represented on the standardized exemplar. Paradoxically, it is this definite knowledge that makes the standardized form unsuitable as a training set in contexts such as described in U.S. Pat. No. 9,355,312, and/or U.S. Pat. No. 9,311,531, respectively.

Accordingly, the presently described inventive techniques, systems, and computer program products include preparation of a knowledge base using definite knowledge that may be derived from a standardized electronic form, in conjunction with statistical manipulation of the definite knowledge derived from the standardized electronic form to account for natural variations in how physical documents are represented in digital images captured using a camera, mobile device, etc. (e.g. perspective distortion, illumination, etc. as noted above).

Figure 3:
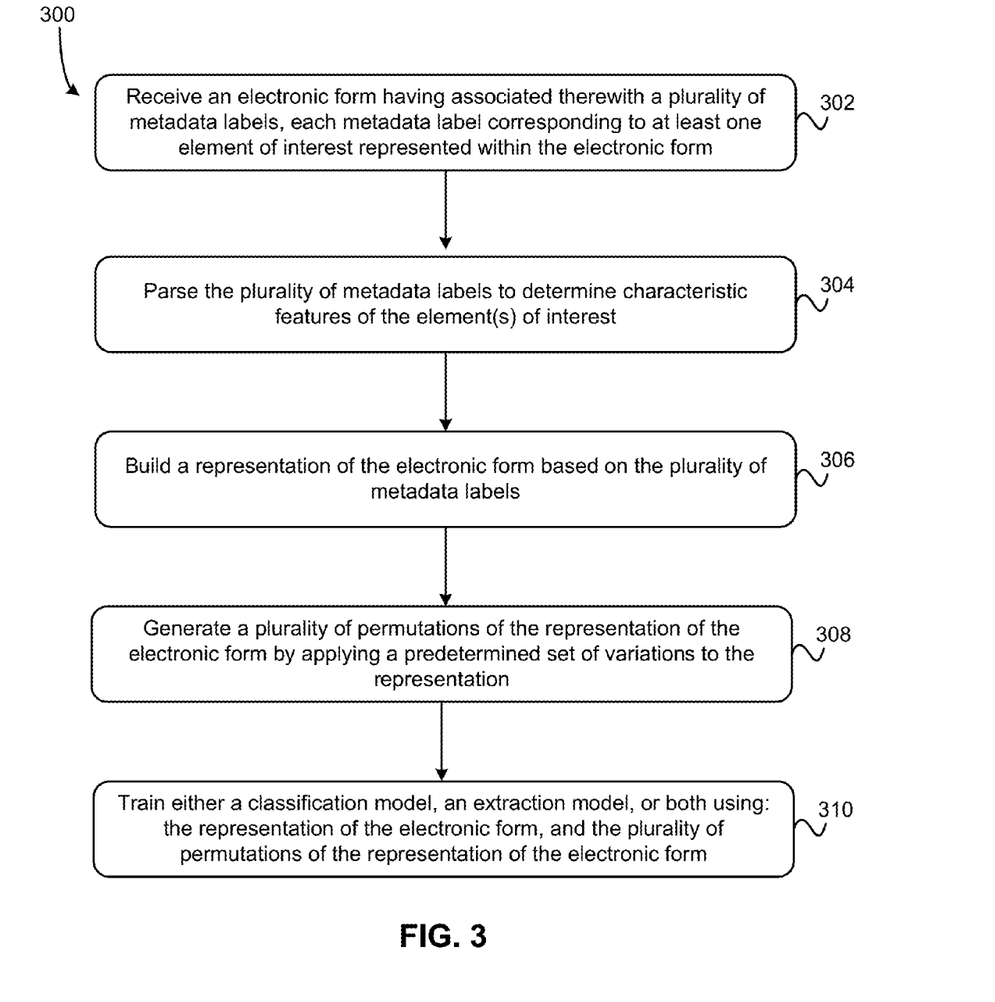
FIG. 3 is a flowchart of a method, according to one embodiment.

To address the foregoing challenges, and in accordance with one exemplary embodiment of the presently disclosed inventive concepts, a novel technique such as represented in method 300 of FIG. 3 may be employed. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor of a mobile device, a processor of a workstation or server environment, some other device having one or more processors therein, or any combination thereof.

The processor, e.g., processing circuit(s), chip(s), and/or module(s) implemented in hardware and/or software, and preferably having at least one hardware component may be utilized in any device to perform one or more steps of the method X00. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where an electronic form having associated therewith a plurality of metadata labels is received. The electronic form is preferably received at or by a mobile device, and serves as input for a training process configured to use electronic forms as a knowledge base. The metadata labels each correspond to at least one element of interest in the electronic form. In alternative embodiments, the electronic form may be received at a server, which may generate a knowledge base for classification and/or extraction, and provide such knowledge base(s) and/or classification/extraction models to a mobile device for subsequent use.

Elements of interest, in the context of the present descriptions, may include anything that is capable of representation on a document. Preferably, in the context of an electronic form, elements of interest include fields of the form that are intended to receive textual input, but may also include non-textual elements such as lines (intersecting or not), logos, patterns, photographs, seals, holograms, radio buttons, check boxes, etc. as would be appreciated by a person having ordinary skill in the art upon reading the present descriptions.

In preferred approaches the metadata labels independently represent one or more characteristic features of the element(s) of interest to which the label(s) respectively correspond. As understood herein, characteristic features may include any type of feature suitable for use in determining whether images of documents belong to a same class as the electronic form, and/or any type of feature suitable for use in extracting information of interest from images of forms or other documents, including but not limited to "object features" as defined and described in U.S. Pat. No. 9,355,312 and/or U.S. Pat. No. 9,311,531, incorporated hereinabove by reference.

In various approaches, characteristic features may include: location information concerning the corresponding element(s) of interest (e.g. absolute location within the electronic form, or a location specified relative to other elements of interest, form boundaries, etc. as would be appreciated by a person having ordinary skill in the art upon reading the present descriptions). Location information may also include information defining the spatial characteristics of the element of interest, e.g. shape, size, aspect ratio, etc.

Characteristic features may additionally or alternatively include content information concerning the corresponding element(s) of interest (e.g. suitable data type such as text, non-text, photograph, yes/no, expected data format (especially for text), etc. as would be appreciated by a person having ordinary skill in the art upon reading the present descriptions).

Characteristic features may also include descriptive label(s) for the corresponding element(s) of interest, such as a field name for a field of a form (e.g. "DOB," "First Name," "License Number" etc. as would be appreciated by a person having ordinary skill in the art upon reading the present descriptions), a description of a subject of a photograph appearing on the electronic form (e.g. face, product name, etc.);

Characteristic features may still further include image features descriptive of the corresponding element(s) of interest, e.g. color information regarding feature foreground elements such as text, and/or background textures such as a document color or pattern upon which foreground elements are superimposed.

Preferably, characteristic features of an electronic form include field locations (including size, aspect ratio, shape, etc.), field types/names, and appropriate data types (e.g. text/non-text, expected format, character/background color info) for each field appearing on the electronic form. These features are particularly useful in the context of extracting information. Skilled artisans will appreciate, upon reading these descriptions, that the above, alone or in combination with or other features, may be utilized in classifying images of documents as well.

Further still, characteristic features may include invariant information represented on an electronic form, such as field labels. Preferably, where characteristic features include such invariant information, the characteristic features also include one or more patterns of text associated with individual pieces of invariant information. For example, and as described further below, text patterns may include a relative location of the invariant information and an associated value (e.g. the data entered into the field corresponding to the field label). Where multiple patterns are possible, characteristic features may include all possible patterns associated with a particular piece of invariant information.

With continuing reference to FIG. 3, method 300 also includes operation 304, in which the metadata labels corresponding to the elements of interest are parsed in order to determine the characteristic features of the elements of interest. The characteristic features may include any combination of the foregoing, without limitation, and preferably the metadata labels also specify a value of data associated with the corresponding element of interest, e.g. text characters represented in a filled-in electronic form, the binary value for a binary selection field (e.g. check/no check, yes/no, +/−, etc.).

Using the characteristic features obtained from parsing the metadata associated with the electronic form enables creation of a representation of the electronic form, and particularly the characteristic features represented therein. This representation may be utilized to obtain highly accurate information regarding the characteristics of the electronic form, e.g. a precise location of a rectangular field, an appropriate OCR alphabet for extracting information from a particular field, a binarization threshold appropriate for binarizing images depicting a particular field, etc. as would be appreciated by a person having ordinary skill in the art upon reading the present disclosures.

Accordingly, method 300 involves building a representation of the electronic form based on the plurality of metadata labels in operation 306. The representation may take any suitable form, but preferably comprises an XML document or a feature vector descriptive of at least the characteristic features obtained by parsing the metadata labels in operation 304. The feature vector or other form of the representation preferably defines various characteristic features of the electronic form according to location, image characteristics (e.g. color information), data type, etc. as described herein. As such, the representation of the electronic form preferably comprises a definition of one or more characteristic features of the electronic form.

The definition may be included in the XML file or feature vector in the form of values representing various of the characteristic features and associated characteristics, such as a feature location, feature type (e.g. metadata label indicating field type such as name, date of birth, social security number, etc. text patterns between invariant information and associated values, and optionally expected format or content values (e.g. permitted character values)), etc. in various embodiments.

In one exemplary implementation, an XML file serving as the representation of the electronic form includes a plurality of elements each designated according to a unique element ID (e.g. a serial number), a page number corresponding to the page of the form upon which the element appears, a location of the element on the respective page (e.g. designated according to top left and bottom right x,y coordinates of a square or rectangular region bounding the element of interest, for example), and a value corresponding to the element.

Again in the context of an electronic form, each element preferably corresponds to an area of the document from which information of interest is to be extracted, and/or into which information of interest is to be populated. Accordingly, in one approach each element preferably corresponds to a field of the electronic form, most preferably a fillable field. The value of each element is preferably the value of text entered into the electronic form. Notably, and as will be discussed further below regarding "fields" in the representation of the electronic form, elements may correspond to portions of a larger data construct within the form, e.g. different lines of field may each individually be elements, but may be part of a single field (e.g. address). Similarly, different words may be different elements, but may be part of a single field (e.g. name).

The representation of the electronic form may also preferably include a plurality of field designations, each field designation being associated with a unique field ID (e.g. a serial number), a page number identifying the page upon which the field appears in the electronic form, a location of the field on the respective page (e.g. designated according to top left and bottom right x,y coordinates of a square or rectangular region bounding the field, for example), a field label describing the field (e.g. address line 1, address line 2, first name, last name, date of birth, nationality, expiration date, license number, issue date, gender, class, category, etc. as would be appreciated by a person having ordinary skill in the art upon reading the present descriptions), and a value corresponding to the field. As with the elements described above, preferably the field value includes textual information represented on the electronic form.

Although the presently disclosed inventive concepts work well using electronic forms without any filled-in fields for purposes of generating classification and/or extraction models, such models may be improved when using a partially- or fully-completed electronic form, as the values in the filled fields may be utilized to gather a-priori knowledge or expectations regarding the corresponding values that may appear in other forms represented by the electronic form. For instance, a classification and/or extraction model may be configured, based on text filled-in on the input electronic form, to define an appropriate OCR alphabet for extracting information from the same field within other representations of the electronic form (e.g. physical copies filled out by other individuals).

The representation of the electronic form may also include global information concerning the electronic form, such as overall dimensions of the form (preferably expressed according to pixels), a name or other identifier associated with the electronic form, a number of pages included in the electronic form, a version number of the electronic form, and an encryption status of the electronic form.

However, and returning to the notion of using an electronic form as a knowledge base, simply using the very accurate information obtainable from an electronic form is not sufficient to train a classification model or an extraction model to robustly classify images of documents (whether the same type of document as the document used to generate the electronic form, or other documents) and extract information therefrom, in large part due to the variations associated with capturing images of such documents.

Accordingly, method 300 includes generating a plurality of permutations of the representation of the electronic form.

The permutations generally represent slight variations of the precise information defining the characteristic features included in the metadata labels, and simulate the use of a learn-by-example training set, but taking the opposite approach (i.e. starting with a single, known exemplar and artificially generating variations, rather than attempting to define the scope of variations based on observations of the various training set examples).

Thus, the permutations of operation 308 are generated by applying a predetermined set of variations to the representation, the electronic form, some or all of the elements of interest represented within the electronic form, and/or the parsed metadata labels. For instance, and again generally speaking, applying variations to the representation may include defining a range of values for each feature of a feature vector describing/forming the representation, or defining a range of values for each element and/or field of an XML document such as described above.

In optional embodiments, the plurality of permutations generated in operation 308 may be further based on at least one of: the electronic form, some or all of the elements of interest represented within the electronic form, and the parsed metadata labels. In one approach, generating the permutations may additionally or alternatively include manipulating the values associated with particular elements of interest, parsed metadata labels, etc. in order to account for likely OCR errors that would generate false negative classifications and/or extractions. For instance, where a field or element is known to contain a value subject to OCR errors, e.g. a serial number of which all individual exemplars begin with a numeral "1", and in practice which OCR frequently identifies as a lowercase "l" character, it may be advantageous to include this variation as a possibility within the classification model, e.g. so that improper OCR of the serial number does not result in a rejection of the proper classification for the electronic form.

The range may be defined based on statistical manipulation of the value of the feature as defined in the representation of the electronic form. For instance, applying statistical variations may include defining a range within a (e.g. normal, Gaussian) distribution of possible values surrounding the value of the feature defined in the representation of the electronic form. In one approach the tails (e.g. the top and bottom 2.5% of possible feature values such as intensity values of 0-6 and 249-255 on a 0-255 scale) of a normal distribution correspond to the extreme ends of possible values, and the value of the feature as depicted in the representation corresponds to the mean/median value of the distribution. The range of values to be represented within the various permutations may be chosen based on a predefined threshold, e.g. within a certain number of standard deviations (preferably in a range from about 0.5 to about 2 standard deviations) of the value of the feature as depicted in the representation.

In other scenarios, varying the location of a particular element of interest within the representation of the electronic form may not be adequate to reflect the variations present within various exemplars of the electronic form. For example, various exemplars of a generic type of form (e.g. an invoice) may be characterized by including a same set of information (e.g. invoice number, date, invoicee name, address, and contact information such as phone, email, etc.; invoicer name, address, and contact information such as phone, email, etc.; line item description and corresponding price (amount); and a total amount of the invoice). However, within each exemplar the location of each piece of information may vary beyond mere statistical variations—i.e. the information may appear in a completely different region of the invoice.

In order to reliably train/build an extraction model that may robustly retrieve such information despite the variation across the many exemplars, it is useful to leverage invariant content (also known as "boilerplate") that will always appear in association with a particular piece of information, e.g. field labels such as "Name" "TOTAL" "AMOUNT" "DESCRIPTION", etc. associated with the various pieces of information, regardless of the location of the individual piece of information within the document as a whole.

Specifically, one implementation involves training the extraction model using permutations of the electronic form representation in the same way as the location-based variations described above. However, instead of permutations representing the locations of the fields of interest, the permutations may be based on pattern(s) of textual values that surround the fields of interest within the various exemplars of the generic electronic form. For example, in one embodiment involving an electronic invoice, the permutations would reflect the fact that the word "TOTAL" is found to the left of the Total field, regardless of the global location of the Total field on the particular invoice exemplar. Preferably, the permutations are also generated so that the extraction model is also tolerant of differences in nomenclature (e.g. "Invoice #" vs. "Invoice Number") and tolerant of the locations of the surrounding text relative to the field of interest (e.g. above, to the left).

While the foregoing exemplary embodiment regarding text patterns has been described with reference to an invoice and invariant information typically included in invoices, skilled artisans will appreciate upon reading the instant disclosures that this principle may be applied to other types of documents including invariant information (e.g. financial documents such as credit cards, checks, account statements, etc.; identification documents such as driver licenses, passports, etc.; medical documents such as charts, patient intake forms, etc.; insurance documents such as claims, appraisals, etc.), without departing from the scope of the present disclosures.

In various approaches, depending on the complexity of the electronic form and corresponding physical versions thereof, and likely capture conditions (e.g. more variation in perspective distortion, illumination, etc. is often associated with smaller documents due to a number of factors beyond the scope of this discussion), the number of permutations suitable for training a classification and/or extraction model may vary. In preferred approaches, the number of permutations necessary to train a classification and/or extraction model to robustly classify images of documents and extract information therefrom is in a range from about 5 to about 20 permutations.

With continuing reference to generating the permutations by applying variations to the representation, in one approach statistical variations regarding the size, location and shape of the elements of interest are of primary importance in the scope of the presently disclosed inventive concepts. Accordingly, generating the permutations of the representation may include modifying the elements of interest with respect to size, location, and shape. Most preferably, the scale of these modifications are predetermined and designed to reflect natural variations that may arise from capturing images of documents, e.g. variations arising from capture angle, illumination, capture resolution, distance, etc. as generally set forth hereinabove.

For example, an element of interest is a rectangular field of a form. Within the electronic form, the precise pixel location of the field borders that form the rectangle may be defined (and typically are, with great accuracy). To account for perspective distortions, which may cause the rectangle to appear as a trapezoid for example, the angle of intersection between the borders of the field may be "loosened" so as to account for deviations from 90°. Other variations suitable to address such deviations may include defining a zone within which a particular element of interest may be located (as opposed to a precise location of the element of interest), variations in an aspect ratio of the element(s) of interest, etc. as would be understood by a person having ordinary skill in the art upon reading the present descriptions.

In a related vein, and with continuing reference to generating the permutations of the representation, if a field is expected to depict black text (e.g. gray intensity=0) on a white background (e.g. gray intensity=255), the permutations generated based thereon may include a range of intensity values beyond true "black" to accommodate for variations in ambient illumination (which may, e.g. cause the text to appear brighter than represented in the field of the electronic form.)

Beyond image characteristics, variations may include changes to the representation of data within the electronic form, e.g. to account for differences in representing the same information according to different conventions, such as MM/DD/YY versus DD/MM/YY for dates. Accordingly, some permutations may represent elements of interest, or more preferably may represent data associated with the elements of interest, according to a different format than the corresponding field and data in the electronic form supplied as input to the training operation.

For instance, in one approach and concerning features that may be represented by numerical values (e.g. intensity, location, etc.) the actual, precise value obtained from the electronic form may be defined the mean of the distribution, and a sigma (standard deviation) may be arbitrarily predefined. In one exemplary embodiment the position of a field is x=250, y=130. Assuming a sigma of 5, generating permutations may involve randomly generating position values a predefined number of times, each position value varying from the observed mean randomly by a value in a range of 0 . . . 5 pixels, for instance rendering x/y pairs such as 246/131, 248/128, 255/135, etc.

Regardless of the particular variations applied to the representation, electronic form, elements of interest, and/or parsed metadata labels, in operation 310 method 300 includes training either a classification model, an extraction model, or both, using the representation of the electronic form, and the plurality of permutations of the representation of the electronic form. As described herein, training may be performed substantially as described in U.S. Pat. No. 9,355,312 and/or U.S. Pat. No. 9,311,531, incorporated hereinabove by reference.

Advantages of employing a method 300 and in particular using an electronic form as a knowledge base for training classification and/or extraction models, include a reduction in computational cost associated with collecting and analyzing an appropriate sampling of exemplar documents in preparation for the training phase, as well as eliminating the processing associated with receiving input from human curators defining the locations and other characteristic features of elements of interest within images.

It is also advantageous from a computing perspective since the definition of e-forms is more exact than obtainable from automatically or manually processing images, which imparts a positive effect on the accuracy of the extractors trained using an electronic form as the knowledge base, rather than a learn-by-example training set. For instance, humans rarely draw a perfect shape, whether it be rectangle, circle, square, etc. but with an e-form the metadata define the exact shape with great accuracy. It is so exact in fact that permutations are necessary to account for the natural variations in captured images. As a result, using the electronic rendering of the form instead of a picture of the form from a training and administrative standpoint eliminates much of the processing and uncertainty because the electronic form comes complete with defined zones, corresponding locations, and even characteristics to some extent.

This approach also provides unparalleled scalability, which results in significant real world economic savings. For instance, in one implementation the inventive techniques described herein may be used to import a collection of e-forms for a state or a federal agency or an insurance company and essentially in little to no time at all support the entire document set. By contrast, conventional learn-by-example training (optionally supplemented with human curation), in a similar scenario would incur costs on the order of hundreds of thousands of dollars.

As noted above, method 300 may include any number of additional and/or alternative functions, features, operations, etc. as described and/or referenced herein, without departing from the scope of the inventive concepts.

For instance, a natural extension of the method 300 includes classifying, using the classification model, one or more images each independently depicting a document as belonging to a same class of document as the electronic form. Classification may be performed in any suitable manner as disclosed herein, and/or U.S. Pat. No. 9,355,312, and preferably includes classifying the image(s) from among a plurality of possible form classifications including the particular class corresponding to the electronic form used to generate the classification/extraction model.

Another natural extension of method 300 includes extracting, using the extraction model, information from one or more images each independently depicting a document belonging to a same class of document as the electronic form. This extension may further include generating a second electronic form comprising a plurality of elements of interest, each element of interest in the second electronic form corresponding to at least one of the elements of interest in the electronic form; and associating the information extracted from the one or more images with appropriate ones of the plurality of elements of interest in the second electronic form.

With regard to associating the information with the second electronic form, In various approaches, the information extracted from images may be used to "auto-fill" the appropriate fields of an electronic form generated based on the electronic form that was used to train the system. For instance, in response to a classification module determining, based on the classification model, that the image(s) depict a document belonging to a same class as the electronic form, a second electronic form with empty fields may be generated (e.g. based on the representation of the electronic form generated for purposes of training). The fields of the second electronic form may be populated with appropriate data extracted from the images.

For example, based on matching a field label (e.g. "Date of Birth") and associated location in the second electronic form with a data type and location of data extracted from the one or more images, the data extracted from the one or more images may be populated in the field with the matching label and location. Matching a field label may include determining the field associated with the field label expects or accepts only data in a same format as the format of the information extracted from the image(s).

In particularly preferred approaches, the elements of interest in the electronic form have a one-to-one mapping relationship with the elements of interest included in the second, generated electronic form.

In one aspect, the electronic form may include machine-printed text, handwritten text, or both represented in association with at least one of the elements of interest. In such instances, the method may include determining a data type associated with one or more of the elements of interest based on analyzing the machine-printed text associated with the one or more of the elements of interest, the handwritten text associated with the one or more of the elements of interest, or both.

For example, analyzing the text associated with the elements of interest may include performing OCR on the region of the digital image depicting the element of interest, and determining a content and/or format of the text. Content may include the identity of individual characters represented in association with the element(s) of interest, such as a restricted OCR alphabet (alphabetic only, numeric only, alphanumeric, etc.), while formatting may include a pattern for representing text such as a particular date format (e.g. "MM/DD/YY," "MM/YY," etc.); a particular currency format (e.g. "$#.##," or "USD #.##"); a particular time format (e.g. "HH:MM:SS," 24-hour 'HH:MM:SS," "HH:MM," etc.); a credit/debit card number format; an account number or routing number format, a particular (e.g. machine-readable) font, etc. as would be understood by a person having ordinary skill in the art upon reading the present descriptions.

Alternatively, data type may be one of the features of the element of interest specified in the metadata labels associated with the original electronic form. In such cases, it is advantageous to obtain/determine the appropriate data types for each element of interest based on parsing the metadata associated with the electronic form.

Determining the data type for information included in the electronic form and associated with particular elements of interest advantageously improves the ability to subsequently extract information from similar forms, as well as detect and correct extraction errors. For example, a priori knowledge regarding the suitable content and/or format of text that may appear on other forms, electronic or physical, may be leveraged to validate the extraction result, or to constrict an OCR alphabet to include only suitable character types when analyzing a particular portion of the digital image.

While the present descriptions have been made with primary reference to methods, one having ordinary skill in the art will appreciate that the inventive concepts described herein may be equally implemented in or as a system and/or computer program product.

For example, a system within the scope of the present descriptions may include a processor and logic in and/or executable by the processor to cause the processor to perform steps of a method as described herein.

Similarly, a computer program product within the scope of the present descriptions may include a computer readable storage medium having program code embodied therewith, the program code readable/executable by a processor to cause the processor to perform steps of a method as described herein.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

Accordingly, one embodiment of the present invention includes all of the features disclosed herein, including those shown and described in conjunction with any of the FIGS. Other embodiments include subsets of the features disclosed herein and/or shown and described in conjunction with any of the FIGS. Such features, or subsets thereof, may be combined in any way using known techniques that would become apparent to one skilled in the art after reading the present description.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for building a classification and/or data extraction knowledge base using an electronic form, the method comprising:
    receiving an electronic form having associated therewith a plurality of metadata labels, each metadata label corresponding to at least one element of interest represented within the electronic form;
    parsing the plurality of metadata labels to determine characteristic features of the element(s) of interest;
    building a representation of the electronic form based on the plurality of metadata labels;
    generating a plurality of permutations of the representation of the electronic form by applying a predetermined set of variations to the representation; and
    training either a classification model, an extraction model, or both using:
    the representation of the electronic form, and
    the plurality of permutations of the representation of the electronic form.

2. The computer-implemented method as recited in claim 1, comprising: classifying, using the classification model, one or more images each independently depicting a document as belonging to a same class of document as the electronic form.

3. The computer-implemented method as recited in claim 1, comprising: extracting, using the extraction model, information from one or more images each independently depicting a document belonging to a same class of document as the electronic form.

4. The computer-implemented method as recited in claim 3, comprising: generating a second electronic form comprising a plurality of elements of interest, each element of interest in the second electronic form corresponding to at least one of the elements of interest in the electronic form; and
    associating the information extracted from the one or more images with appropriate ones of the plurality of elements of interest in the second electronic form.

5. The computer-implemented method as recited in claim 1, wherein the electronic form comprises machine-printed text, handwritten text, or both represented in association with at least one of the elements of interest; and the method comprising: determining a data type associated with one or more of the elements of interest based on analyzing the machine-printed text associated with the one or more of the elements of interest, the handwritten text associated with the one or more of the elements of interest, or both.

6. The method as recited in claim 1, comprising determining a data type associated with one or more of the elements of interest based on parsing the plurality of metadata labels.

7. The computer-implemented method as recited in claim 1, wherein the representation of the electronic form comprises a definition of one or more characteristic features of the electronic form.

8. The computer-implemented method as recited in claim 7, wherein the characteristic features are selected from: invariant information represented on the electronic form and associated text patterns; field locations for each field represented on the electronic form; field names for each field represented on the electronic form; data types for each field represented on the electronic form; and image features descriptive of corresponding element(s) of interest represented on the electronic form.

9. The computer-implemented method as recited in claim 1, wherein the representation comprises an XML document defining a plurality of elements and a plurality of fields of the electronic form.

10. The computer-implemented method as recited in claim 1, wherein the plurality of permutations are further based on at least one of: the electronic form, some or all of the elements of interest represented within the electronic form, and the parsed metadata labels.

11. A system comprising a processor configured to execute logic, the logic being configured, upon execution thereof by the processor, to cause the processor to perform a computer-implemented method comprising:
receiving an electronic form having associated therewith a plurality of metadata labels, each metadata label corresponding to at least one element of interest represented within the electronic form;
parsing the plurality of metadata labels to determine characteristic features of the element(s) of interest;
building a representation of the electronic form based on the plurality of metadata labels;
generating a plurality of permutations of the representation of the electronic form by applying a predetermined set of variations to the representation; and
training either a classification model, an extraction model, or both using:
the representation of the electronic form, and
the plurality of permutations of the representation of the electronic form.

12. A computer program product comprising a computer readable storage medium having embodied thereon computer readable program instructions configured to cause a mobile device, upon execution of the computer readable program instructions, to perform operations comprising:
receiving an electronic form having associated therewith a plurality of metadata labels, each metadata label corresponding to at least one element of interest represented within the electronic form;
parsing the plurality of metadata labels to determine characteristic features of the element(s) of interest;
building a representation of the electronic form based on the plurality of metadata labels;
generating a plurality of permutations of the representation of the electronic form by applying a predetermined set of variations to the representation; and
training either a classification model, an extraction model, or both using:
the representation of the electronic form, and
the plurality of permutations of the representation of the electronic form.

13. The computer program product as recited in claim 12, comprising computer readable program instructions configured to cause the mobile device, upon execution of the computer readable program instructions, to: classify, using the classification model, one or more images each independently depicting a document as belonging to a same class of document as the electronic form.

14. The computer program product as recited in claim 12, comprising computer readable program instructions configured to cause the mobile device, upon execution of the computer readable program instructions, to: extract, using the extraction model, information from one or more images each independently depicting a document belonging to a same class of document as the electronic form.

15. The computer program product as recited in claim 14, comprising computer readable program instructions configured to cause the mobile device, upon execution of the computer readable program instructions, to: generate a second electronic form comprising a plurality of elements of interest, each element of interest in the second electronic form corresponding to at least one of the elements of interest in the electronic form; and
associate the information extracted from the one or more images with appropriate ones of the plurality of elements of interest in the second electronic form.

16. The computer program product as recited in claim 12, wherein the electronic form comprises machine-printed text, handwritten text, or both represented in association with at least one of the elements of interest; and the method comprising: determining a data type associated with one or more of the elements of interest based on analyzing the machine-printed text associated with the one or more of the elements of interest, the handwritten text associated with the one or more of the elements of interest, or both.

17. The computer program product as recited in claim 12, comprising computer readable program instructions configured to cause the mobile device, upon execution of the computer readable program instructions, to: determine a data type associated with one or more of the elements of interest based on parsing the plurality of metadata labels.

18. The computer program product as recited in claim 12, wherein the representation of the electronic form comprises a definition of one or more characteristic features of the electronic form.

19. The computer program product as recited in claim 12, wherein the representation comprises an XML document defining a plurality of elements and a plurality of fields of the electronic form.

20. The computer program product as recited in claim 12, wherein the plurality of permutations are further based on at least one of: the electronic form, some or all of the elements of interest represented within the electronic form, and the parsed metadata labels.

* * * * *